United States Patent [19]

La Rocca

[11] 4,288,679

[45] Sep. 8, 1981

[54] METHOD OF MICRODRILLING METAL WORKPIECES USING A POWER LASER

[75] Inventor: Aldo V. La Rocca, Moncalieri, Italy

[73] Assignee: Fiat Auto S.p.A., Turin, Italy

[21] Appl. No.: 125,317

[22] Filed: Feb. 28, 1980

[51] Int. Cl.³ ............................................. B23K 26/16
[52] U.S. Cl. .......................... 219/121 LL; 219/10.47; 219/121 PB; 219/121 FS
[58] Field of Search ...... 219/10.47, 121 EH, 121 LK, 219/121 LL, 121 LG, 121 LJ, 121 LN, 121 L, 121 LM, 121 LH, 121 FS, 121 PC, 121 PH, 121 PA, 121 PB, 121 PY

[56] References Cited

U.S. PATENT DOCUMENTS

| | | | |
|---|---|---|---|
| 3,383,491 | 5/1968 | Muncheryan | 219/121 LZ X |
| 3,527,198 | 9/1970 | Takaoka | 219/121 FS X |
| 4,167,662 | 9/1979 | Steen | 219/121 LL X |

FOREIGN PATENT DOCUMENTS 2713904  10/1978  Fed. Rep. of Germany ...... 219/121 LM

OTHER PUBLICATIONS

L. Marton, *Record of the 10th Symposium on Electron, Ion and Laser Beam Technology,* May 1969; San Francisco Press, Inc., pp. 225-230; Article Entitled "Some Novel Approaches in the Utilization of Lasers in Materials Processing" by Barber and Lin.

*Primary Examiner*—Gene Z. Rubinson
*Assistant Examiner*—Keith E. George
*Attorney, Agent, or Firm*—Sughrue, Mion, Zinn, Macpeak & Seas

[57] ABSTRACT

A laser microdrilling method uses a power laser beam the action of which causes solid workpiece metal to be transformed into both liquid and vapor phases. In order to improve the surface finish and dimensional accuracy of a hole formed, the workpiece is heated to a temperature sufficient to cause both the liquid phase formed directly by the action of the laser beam and the liquid phase caused by the condensation of the vapor phase on the wall of the hole being formed, to be maintained in the liquid state for a period of time long enough to permit the uniform spreading of these liquid phases over the wall of the hole.

3 Claims, 3 Drawing Figures

METHOD OF MICRODRILLING METAL WORKPIECES USING A POWER LASER

The present invention relates to a method of microdrilling metal workpieces using a power laser beam.

By the term microdrilling is meant the forming of holes with a diameter of less than a millimeter. An example of the type of hole which can be formed by the method of the present invention, is the fuel discharge holes of a fuel injector for an internal combustion engine, such holes having a diameter of between 0.1 and 0.5 mm.

The microdrilling of a metal workpiece using a power laser involves focusing a laser beam on the workpiece at the point where a hole is to be formed and then energising the laser to produce pulses of laser radiation. The laser radiation energy causes melting and vaporization of the metal so that both a vapour phase and a liquid phase are produced. The desired hole is therefore produced by the removal of material in the two aforementioned phases.

While the hole being formed is blind, the removal of the liquid phase is achieved by feeding into the hole a shielding gas, for example, helium, normally used in laser processes to reduce the phenomenon of 'blanketing' of the laser radiation by a zone of plasma formed between the workpiece and the source of laser radiation as a result of the vaporization of the material.

When the power density of the laser beam is very high, the liquid phase can be removed by utilising the phenomenon of 'laser supported detonation' (L.S.D.) which for each pulse of laser radiation gives rise to a pressure wave which moves out of the hole being formed at a high supersonic speed and is very efficient for removing from the hole fluid material and any solid products such as oxides and nitrides; at the same time, this pressure wave serves to form a new and smooth the sides of the hole.

However, with the known methods of drilling using a power laser it has not been possible to form holes with a surface finish and dimensional accuracy which are acceptable in certain applications, such as the fuel discharge holes of fuel injectors of internal combustion engines, where a high grade finish is required to avoid cavitation phenomena occurring during use.

The unsatisfactory finish to holes formed by known laser microdrilling techniques, is due to the fact that the transformation of the material of the workpiece from the solid phase to a liquid phase and to a vapour phase is very rapid so that there is virtually no time for heat to be transmitted into the body of the workpiece. In practice, only a very small thickness of the workpiece material surrounding the hole being formed is thermally affected by the laser microdrilling process, this thickness being of the order of thousandths of a millimeter; as a result, after a pulse of laser radiation very rapid cooling occurs with the cavity constituted by the partly-formed hole acting like a heat sink.

Due to this cooling effect, the liquid phase immediately solidifies upon contact with the wall of the hole and adheres to this wall with the formation of surface irregularities. At the same time, condensation of the vapour phase produces more liquid which, due to the rapid cooling, does not have time to spread out over the walls of the hole before solidifying.

For the purpose of improving the quality of finish of holes formed by laser microdrilling techniques, it has been proposed to rotate the workpiece or the laser beam about the axis of the beam ("trepanning"); however, even with this arrangement it is not possible to obtain holes having a satisfactory quality for certain particular applications, such as for fuel injector nozzles.

It is therefore an object of the present invention to provide a laser microdrilling method which enables the formation of holes with an improved surface finish and dimensional accuracy previously obtainable only by conventional, non-laser, techniques which are extremely costly.

Accordingly, the present invention provides a method of microdrilling metal workpieces using a power laser, which includes the operation of heating the workpiece to a temperature sufficient to cause both the liquid phase formed directly by the action of laser beam and the liquid phase caused by the condensation of the vapour phase on the wall of the hole being formed, to be maintained in a liquid state for a period of time long enough to permit the uniform spreading of these liquid phases over the wall of the hole.

Preferably, the heating of the workpiece is effected by an electromagnetic induction heating process, by an electrical resistance heating process or by the action of a plasma torch of a neutral gas.

Advantageously, the surface of the workpiece is further heated by a plasma torch the jet of which acts along the axis of the laser beam on the face of the workpiece opposite that on which the laser beam is acting.

A laser microdrilling method according to the invention will now be particularly described by way of example, with reference to the accompanying diagrammatic drawings, in which.

Figure 1:
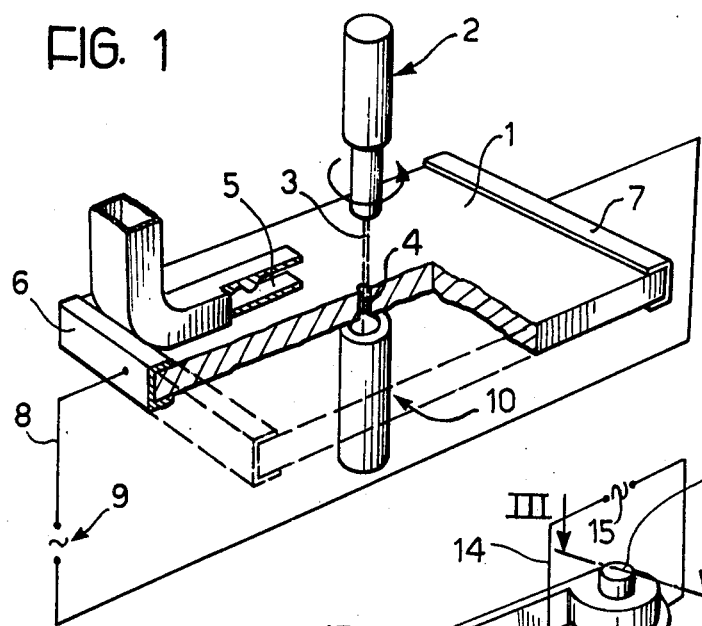
FIG. 1 is a perspective view of apparatus arranged to form a hole in a metal plate in accordance with said laser microdrilling method.

The apparatus shown in FIG. 1 comprises a laser generator 2 arranged to focus a pulsed beam 3 of laser radiation onto a metal workpiece 1 (in the form of a plate) in order to form a hole 4.

A nozzle 5 serves to direct shielding gas, for example, helium to the microdrilling zone.

The nozzle 5 preferably forms part of an apparatus for the control of the shielding gas, this apparatus being described in Applicants Italian Patent application No. 67465-A/79 filed on Mar. 5, 1979.

Two clamps 6 and 7 made of an electrically conducting material are secured to opposite ends of the workpiece 1 and are connected via a conductor 8 to a voltage source 9 for the purpose of effecting electrical resistance heating of the workpiece 1.

This heating is so controlled as to heat the workpiece 1 up to a temperature sufficient to cause the liquid metal phases, formed directly or indirectly in the hole 4 under the action of the laser beams, to remain in a liquid state for a period of time long enough to permit their uniform spreading over the walls of the hole 4 like a film. This spreading of the liquid metal phase occurs due to the action of the pressure impulse generated by each laser radiation pulse and, if necessary, under the action of a flow of shielding gas fed into the zone to be microdrilled.

The resistance heating of the workpiece 1 prevents the wall of the hole 4 from functioning as a "heat sink", and thereby prevents the liquid metal phases from solidifying and adhering to the wall of the hole 4 in an irregular manner due to very rapid cooling following termination of a laser radiation pulse.

The workpiece 1 and the laser beam 3 can be rotated relative to each other about the axis of the beam 3 in order to further increase the uniformity of the surface of the wall of the hole 4. The effect of this rotation is to compensate for any irregularity existing in the laser beam and to facilitate spreading of the liquid phase over the wall of the hole 4 through the action of centrifugal forces.

A neutral-gas plasma torch 10 can be directed along the axis of the laser beam 3 towards the surface of the workpiece 1 which is opposite to that upon which the laser beam 3 is acting.

The torch 10, besides contributing to the heating of the workpiece 1, also fulfils several other functions as is described below.

At the end of the microdrilling operation, the jet of the torch 10 effects a further heating of the walls of the hole 4, performing a final operation of flame polishing or a further spreading of the liquid phase and providing for a further elimination of microcracks which may be generated in conditions of rapid cooling.

The jet of the plasma torch also serves to expel from the hole 4 any solid particles, such as, for example, metal oxides or nitrides generated in the highly reactive environment presented by the combined presence of the laser beam and superheated metal vapours. The plasma torch jet further serves to prevent contamination by ambient air due to imperfect shielding by the flowing shielding gases.

Although FIG. 1 illustrates the use of the plasma torch 10 jointly with the resistance heating equipment, it is possible to use the plasma torch 10 as the sole source of heating of the workpiece 1.

Figure 2:
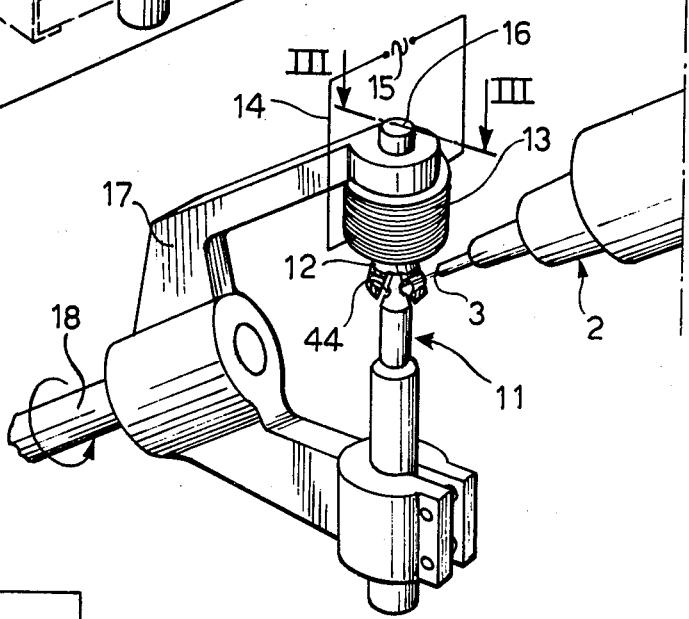
FIG. 2 is a perspective view of further apparatus arranged to form fuel-discharge holes in fuel injectors in accordance with the said laser microdrilling method.
Figure 3:
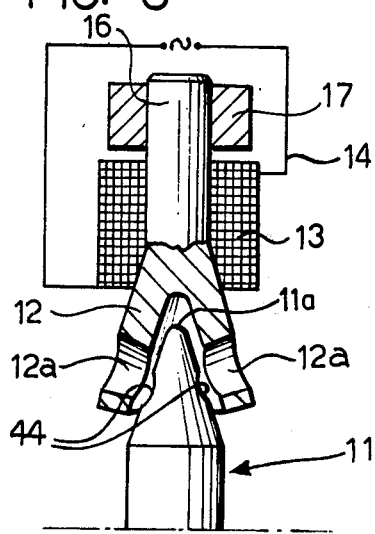
FIG. 3 is a part-sectional view to an enlarged scale on line III—III of FIG. 2.

The apparatus shown in FIGS. 2 and 3, includes a laser beam generator 2 arranged to form holes at locations 44 in the tip 11a of a fuel injector 11 of the type used for the injection of fuel in internal combustion engines.

In order to effect heating of the injector tip 11a a metal bell element 12 is placed over the tip 11a. This bell element 12 is provided with apertures 12a for the passage of the laser beam 3, and externally mounts an electrical winding 13 which is connected, by means of a conductor 14, to a source 15 of alternating current, preferably of high frequency.

Upon energisation of the winding 13 with alternating current, induced currents are caused to flow in the injector tip 11a due to its positioning within the magnetic pole piece constituted by the bell element 12. These induced currents cause heating of the tip 11a sufficient to enable the required spreading of the liquid metal phases during the laser microdrilling process.

The bell element 12 is provided with a shank 16 which is secured to a support 17 which also mounts the injector 11. The support 17 is provided with a shaft 18 by means of which it can be rotated about the axis of the laser beam 3.

The described laser microdrilling methods make it possible to form holes having a surface finish and a dimensional accuracy better than those obtainable with conventional laser microdrilling technology. In addition, the described methods enable laser microdrilling to be effected with a wider range of laser-beam power levels and pulse forms, the choice of these parameters for any particular application being less critical. As a result, less powerful lasers with greater controllability can be used.

I claim:

1. A method for microdrilling a hole in a metal workpiece using a power laser beam the action of which causes solid workpiece metal to be transformed into both liquid and vapour phases, said method including the operation of heating the workpiece to a temperature sufficient to cause both the liquid phase formed directly by the action of the laser beam and the liquid phase caused by the condensation of the vapour phase on the wall of the hole being formed, to be maintained in the liquid state for a period of time long enough to permit the uniform spreading of these liquid phases over the wall of the hole wherein said heating is accomplished by directing a plasma torch of a neutral gas along the axis of said laser beam, onto the face of the workpiece opposite that on which the laser beam acts whereby upon the formation of a through hole in the workpiece by the action of the laser beam, the plasma jet serves to effect further spreading of the liquid phases over the wall of the hole.

2. A method according to claim 1, wherein the workpiece is further heated by an electromagnetic induction heating process.

3. A method according to claim 1, wherein the workpiece is further heated by an electrical resistance heating process.

* * * * *